Sept. 27, 1966 T. O. WEIGEL 3,275,117
COMPACT VERTICAL BALE ELEVATOR
Filed Oct. 19, 1964

INVENTOR.
TERRENCE O. WEIGEL
BY John P. Murphy
ATTORNEY

United States Patent Office 3,275,117
Patented Sept. 27, 1966

3,275,117
COMPACT VERTICAL BALE ELEVATOR
Terrence O. Weigel, R.F.D. 1, Sauquoit, N.Y.
Filed Oct. 19, 1964, Ser. No. 404,566
2 Claims. (Cl. 198—7)

This invention relates generally to apparatus for elevating articles from a loading point to a storage or conveyor level, and more specifically to a compact vertical bale elevator.

Bale elevators such as are used to raise hay bales from floor or ground level to a loft in a barn or the like are generally of the inclined plane type. The chief disadvantage of this type is the area which it must necessarily occupy. For instance, a 45° inclined plane elevator with a lift of 24 feet requires a minimum floor or ground area with a length of 24 feet. The same elevator may not even fit into a barn where lofting of the bales might be most convenient in the case of limited floor space, making the task most difficult to accomplish the lofting through an upper outside opening in the barn. Moreover, the same elevator requires a conveyor with a reach of approximately 34 feet. This condition contributes greatly to the cost of the elevator to the farmer, and further to the problem of storing the elevator under cover from the elements.

Another disadvantage is the difficulty of handling of the inclined plane type. Although most models are mounted on wheels with the conveyor in inclined position, adjustment and other handling is almost always required in order to position the elevator properly to the barn hay door or the like.

It is therefore a main object of this invention to provide a compact vertical bale elevator which is of minimum size required for the amount of lift to be obtained.

Another main object of the invention is to provide a compact vertical bale elevator which will be substantially the same size with respect to floor area occupied regardless of the amount of lift required.

Another important object is to provide a vertical bale elevator which, while requiring minimum floor space during operation, conveniently adapts to even less area or space for storage.

A further object is to provide a bale elevator of the nature described with means for preventing bales or the like from accidentally discharging from the side of the elevator and thence falling on workmen or other equipment and causing injury or damage.

Further objects and advantages of the invention will become apparent from the following detailed specification, when read with reference to the drawings.

In carrying out the objects of the invention, there is provided a vertical bale elevator comprising a bale receiving bed and an elevator frame with guide rails and discharge guides. A driven elevator chain means with bale support flights thereon is disposed along the bed and the frame means for moving a bale from the bed into the frame means and thence elevating the bale for discharge at the top of the elevator.

Figure 1:
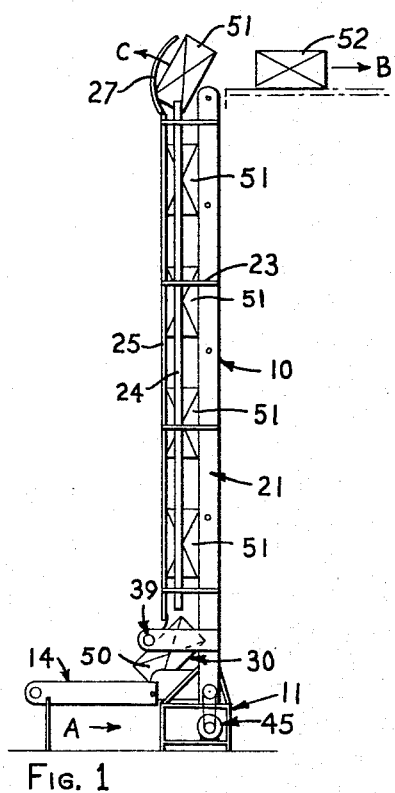
FIG. 1 is a simplified side elevational view showing the main elements of the elevator and the manner in which bales are elevated and discharged.

In FIG. 1 a vertical bale elevator according to a preferred embodiment of the invention is shown as at 10 comprising a support base 11, a bale receiving bed 14 depending from support base 11, vertical elevator frame means 21 carried by and rising above the base 11, guide rails 24 and 25, discharge guide means 27, bale feed means 39 and power means 45 for driving the elevator chain means 30.

Bales 50, 51 and 52 will be discussed further to illustrate the operation of the invention.

Figure 2:
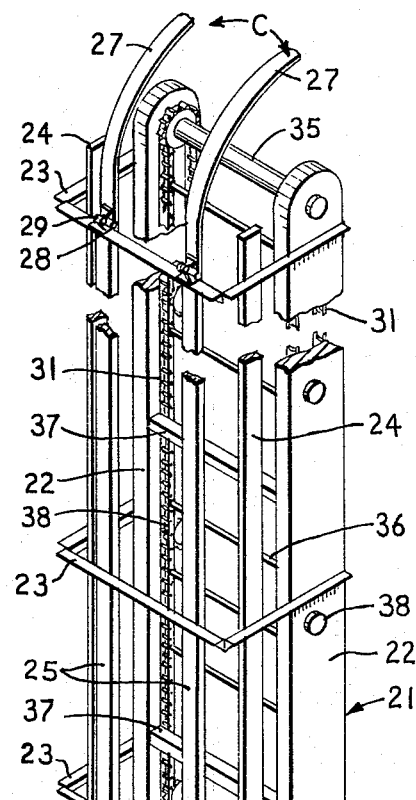
FIG. 2 is an enlarged perspective view illustrating the details of a preferred embodiment of the elevator.
Figure 2:
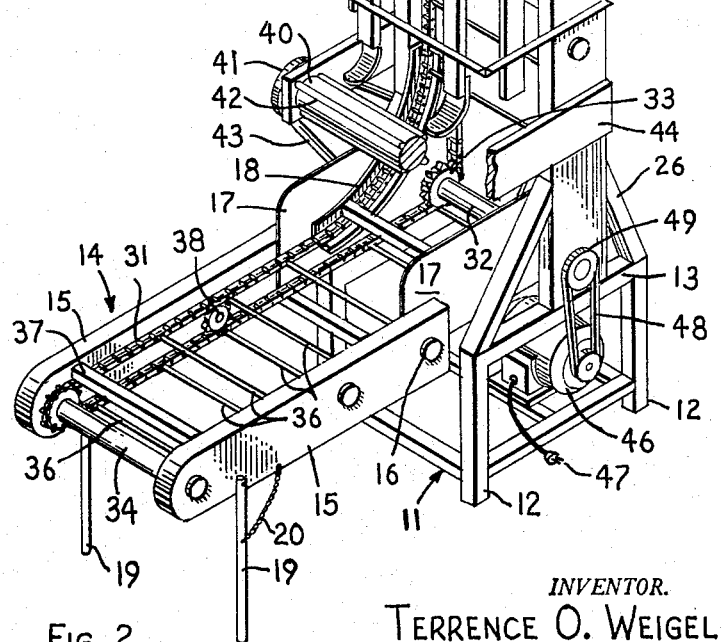

Further structural details are shown more clearly in FIG. 2. The support base 11 may comprise any suitable horizontal frame 13 and legs 12 adapted to rest on the ground or barn floor (not shown), and to carry the other elements of the invention.

The bale receiving bed 14 comprises a pair of opposed beams 15 formed of wood or metal as desired which depend from the base 11 by means of pivot pins 16 or the like. The pins 16 extend through beams 15 and into a corresponding pair of guide plates 17 mounted on the frame 13 and which serve to guide bales into the vertical frame, as will appear. It will be seen that the receiving bed 14 is therefore foldable out of the horizontal bale receiving position shown in the drawing to a substantially vertical position against the vertical frame means 21. However, while the bed 14 is in the position shown, a pair of legs 19 with restraining chains or the like 20 facilitate horizontal disposition of the bed with respect to the floor or ground.

The vertical elevator frame means 21 similarly comprises a pair of opposing vertical beams 22 corresponding to beams 15, and is carried by the support base 11 and suitably braced by braces 26 so as to rise above the base 11. A plurality of spacer frames 23 may be provided fastened to the beams 22 and spaced vertically above the base 11. Spacer frames 23 may be formed from angle iron or the like.

Carried by and attached to spacer frames 23 are vertical side guide rails 24 and front guide rails 25, which may be formed of wooden boards or the like. The area or space defined between the rails 24, 25 and the beams 22 is thus of proper size to just permit a conventional size bale to pass easily in a vertical direction, as will appear.

Figure 3:
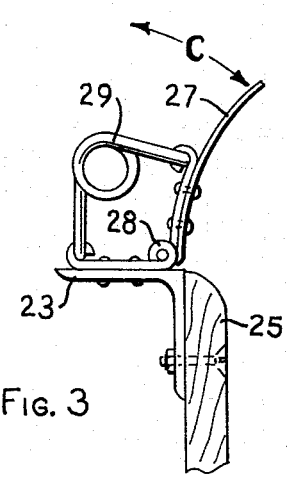
FIG. 3 is an enlarged fragmentary view of a portion of the discharge guide means of the embodiment according to FIG. 2.

Discharge guides 27, as required, are hingedly attached to the uppermost spacer frame 23 (FIGS. 2 and 3) by means of hinge 28 which may be bolted or riveted to each of frame 23 and member 27. The discharge guides 27 comprise arc-shaped metal members which normally curve from adjacent the ends of guides 25 up and over the top of beams 22, such that a bale being elevated beyond the uppermost spacer frame 23 will be guided to discharge horizontally toward the rear of the elevator frame 21. Any suitable loading spring 29, such as a torsion spring or the like, may be connected between the frame 23 and hinge 28 or guide 27 so as to urge the guides 27 toward the normal position of FIGS. 2 and 3 and at the same time permit movement of the guides 27 forwardly and backwardly in the direction of arrow C, as will appear.

It should be noted that the guides 27 may be disposed so as to discharge a bale to one side or the other of the frame 21, or to the front, depending upon which side of the defined bale elevating area the guides 27 are mounted.

At the outer end of receiving bed 14 is a rotary shaft 34 disposed between the ends of beams 15. Idler sprockets may be formed as an integral part of the shaft 34 or may be disposed separately thereon. A similar shaft 35 and sprockets is disposed at the top end of vertical elevator frame means 21.

A driven elevator chain means 30 is disposed or mounted within the frame means 21 and receiving bed means 14. Chain means 30 comprises a pair of endless link chains 31 operable over sprockets to move a bale from the receiving bed to the discharge guides. It will be seen that chains 31 are transversely spaced so as to be disposed adjacent respective beams 15 and 22. Drive means interconnecting the chains 31 for same speed movement is provided in the form of drive shaft 32 and drive sprockets 33 integral therewith disposed conveniently through the lower ends of beams 22. A channel 18 of arcuate form may be disposed between each corresponding beam 15 and 22 to guide the chain 31 from bed 14 to frame means 21.

A plurality of flights 37 are provided disposed transversely between corresponding points on the chains 31, and may be in the form of wooden cleat-like members adapted to support and elevate a bale placed along the chains. A plurality of spacer rods 36 is likewise provided approximately one foot apart along the pair of chains for spacing same apart, and for providing support for bales riding therealong. A plurality of spacer sprockets 38 may be provided disposed substantially as shown spaced along beams 15 and 22 to maintain chains 31 in proper position during operation.

Feed means 39 for moving a bale from receiving bed 14 into elevator frame means 21 comprises a driven roller 40 connected with a pulley 41 for being driven by any belt 43, and a cleat 42 forming a part of the roller. All may be mounted on any support beams such as at 44, such that the roller 40 will be in position according to the showing in FIG. 1.

Power means 45 for driving the chain means 30 may comprise an electric motor 46 and the usual power connection 47. A belt drive 48 is connected to pulley 49 which, in turn, is on shaft 32 for driving chain means 30. Belt 43 may derive its motive power from any pulley arrangement (not shown) on the opposite end of shaft 32.

The operation of the invention is inherently simple. Referring to FIG. 1, the elevator is shown hypothetically as being placed on a barn floor where bales will be loaded on receiving bed 14 for being elevated to the broken line position representing a loft or the like adjacent the discharge end of frame means 21. It should be apparent that with the motor 46 operating, chain means 30 moves in clockwise direction. That is to say, the chains 31 move up the face of frame means 21 facing the guide rails, over shaft 35, down the back and around drive sprockets 33, along the bottom of receiving bed 14 and around shaft 36, thence up channels 18 to the face of frame means 21, continuously. Now any bale 50 is loaded on receiving bed 14 and is advanced by the chains in the direction of arrow A to feed means 39 when and as a flight 37 engages said bale. The cleats 42 on feed means roller 40 likewise engage the said bale to feed the bale into the area defined by beams 22 and guide rails 24 and 25, simultaneously with the movement of the chains. Not only do spacer rods 36 maintain proper position of the chains, but they also serve to support the bale against movement laterally away from guide rails 25. Several bales may be elevated at a time as shown by the schematic positions denoted at 51 in FIG. 1.

During their rise along frame means 21, the bales 51 are maintained in proper position by guide rails 24 and 25. However, at the top of the elevator the uppermost bale encounters discharge guides 27 and, due to the position of the bale, moves guides 27 in the direction of arrow C momentarily against the urging of springs 29. Just as the bale is about to pass the top of the frame means 21, the urging of springs 29 forces the bale to tip over the shaft 35 and therefore discharge from the top of the elevator to the position of bale 52, moving in the direction of arrow B.

It should be pointed out that the discharge of bales may be accomplished onto the floor of a loft, upper layers of lofted bales, conveyor or any other area. The speed of the elevator may further be regulated depending on the amount of help available to operate same and remove bales at the top. Complete safety is afforded the operator loading the elevator at the bottom since the guide rails prevent any accidental discharge of bales except at the discharge area. The elevator may further be made available in a few basic heights according to standard elevations used, but one would not require the exact height according to the size of his barn, etc. One great advantage lies in the fact that the elevator may be left in the barn at the elevating site, with the receiving bed folded, since the whole device occupies very little space. This represents a distinct savings to the owner in that the elevator need not be hauled outside for storage exposed to the elements, thereby reducing maintenance costs or losses. In this respect, it is pointed out that, regardless of the height of the elevator, it will occupy substantially the same floor space as opposed to inclined plane conveyors.

A preferred embodiment of the invention having been disclosed for the purpose of illustration, it is to be understood that the invention is not to be limited thereto, but is to be construed in the true spirit and scope of the appended claims.

I claim:

1. A vertical bale elevator comprising a support base, a bale receiving bed depending horizontally from a side of said base; elevator frame means including opposing vertical beams carried by said base and guide rails spaced from said beams for guiding said bales; discharge guides comprising an arcuate member, pivotally connected at one end to the top of said frame means, and a loading torsion spring connected between said frame means and said guide, said torsion spring adapted to maintain said guide in normal bale discharge position and adapted to permit movement of said guide during passage of a bale thereby, and adapted to positively propel said bale forward in discharge relationship to the elevator frame means; driven elevator chain means comprising a pair of endless link chains disposed along said vertical beams and said bed operative to move a bale from said bed into said frame means and elevate the bale; bale support flights spaced along said chain means for moving said bales vertically up said chain; drive means interconnecting said chains for movement at the same speed; a bale feed roller including cleats operative to urge a bale upwardly into said frame means from said bed; and power means comprising a motor operatively connected to said drive means and said feed roller.

2. A vertical bale elevator comprising a support base, a bale receiving bed depending horizontally from a side of said base; elevator frame means including opposing vertical beams carried by said base, guide rails spaced from said beams for guiding said bales and discharge guides comprising an arcuate member, pivotally connected at one end to the top of said frame means, and a torsion loading spring connected between said frame means and said guide, said torsion spring adapted to maintain said guide in normal bale discharge position and adapted to permit movement of said guide during a passage of a bale thereby, carried at the top of said frame means; driven elevator chain means comprising a pair of endless link chains disposed along said vertical beams and said bed operative to move a bale from said bed into said frame means and elevate the bale; bale support flights for moving said bales vertically up said chain and being spaced along said chain means; drive means interconnecting said chains for movement at the same speed; a bale feed roller including cleats operative to urge a bale upwardly into said frame means from said bed; and power means comprising a motor operatively connected to said drive means and said feed roller.

References Cited by the Examiner
UNITED STATES PATENTS

| | | | |
|---|---|---|---|
| 809,373 | 1/1906 | Hof et al. | 198—113 |
| 2,397,570 | 4/1946 | Smoker | |
| 2,541,523 | 2/1951 | Lang | |
| 2,765,901 | 10/1956 | Smoker | 198—167 |
| 2,785,810 | 3/1957 | Kneib | 214—42 |
| 3,182,782 | 5/1965 | Beiler et al. | 198—7 |

EVON C. BLUNK, *Primary Examiner.*

SAMUEL F. COLEMAN, *Examiner.*

R. M. WALKER, M. L. AJEMAN, *Assistant Examiners.*